United States Patent [19]

McKinney et al.

[11] Patent Number: 4,962,137
[45] Date of Patent: Oct. 9, 1990

[54] FLAME SPRAYABLE EPOXY COATING COMPOSITIONS

[75] Inventors: Osborne K. McKinney; Randy S. Moore; James E. Wernli, all of Lake Jackson, Tex.

[73] Assignee: The Dow Chemical Company, Midland, Mich.

[21] Appl. No.: 326,932

[22] Filed: Mar. 22, 1989

[51] Int. Cl.$^5$ .............................................. C08L 63/00
[52] U.S. Cl. .................................... 523/400; 523/427; 525/119; 428/413
[58] Field of Search ................ 523/400, 427; 525/119, 525/117, 108

[56]  References Cited

U.S. PATENT DOCUMENTS

| | | | |
|---|---|---|---|
| T. 973,015 | 8/1978 | Chadwick et al. | 428/36 |
| 2,676,932 | 4/1954 | Deniston | 260/23 |
| 2,718,473 | 9/1955 | Powers | 117/49 |
| 2,866,718 | 12/1958 | Guzzetta | 117/21 |
| 2,962,387 | 11/1969 | Noeske et al. | 117/47 |
| 3,222,314 | 12/1965 | Wolinski | 260/332 |
| 4,172,161 | 10/1979 | Feldmann et al. | 427/195 |
| 4,173,658 | 11/1979 | Bax et al. | 427/27 |
| 4,276,390 | 6/1981 | Nakabayashi et al. | 525/61 |
| 4,388,373 | 6/1983 | Longo et al. | 428/413 |

FOREIGN PATENT DOCUMENTS 62-2866  1/1987  Japan .

Primary Examiner—Lewis T. Jacobs

[57] ABSTRACT

Flame sprayable coating compositions are prepared from (A) a melt blended, pre-reacted component comprising (1) from about 75 to about 98 percent by weight of at least one solid epoxy resin having a degree of polymerization of from about 0 to about 7; and (2) from about 5 to about 15 percent by weight of at least one olefinic polymer containing from about 0.1 to about 55 percent by weight of a group reactive with vicinal epoxy groups; (B) a melt blended, pre-reacted component comprising (3) from about 10 to about 60 percent by weight of at least one solid epoxy resin having a degree of polymerization of from about 1 to about 6; and (4) from about 40 to about 90 percent by weight of at least one olefinic polymer containing from about 0.1 to about 55 percent by weight of a group reactive with vicinal epoxy groups; and (C) a melt blended, non-reacted composition comprising (5) from about 40 to about 90 percent by weight of at least one solid epoxy resin having a degree of polymerization of from about 1 to about 10; and (6) from about 10 to about 50 percent by weight of at least one inorganic filler.

30 Claims, No Drawings

FLAME SPRAYABLE EPOXY COATING COMPOSITIONS

FIELD OF THE INVENTION

The present invention concerns flame sprayable epoxy resin coating compositions and articles coated therewith.

BACKGROUND OF THE INVENTION

Epoxy resins generally provide the basis for powder coatings having excellent properties. These powder coatings are usually applied by electrostatic spraying or by means of fluidized beds wherein a heated article is suspended in a fluidized bed of the powder coating. In some instances where preheating and/or postheating is impractical, such as in field maintenance, repair and new installation activities, it would be desirable to apply epoxy based powder coatings by the flame spray technique wherein a powder coating formulation is passed through a flame whereupon the coating is melted and forced upon the article being coated. Attempts to employ conventional powder coating compositions by this flame spray technique has resulted in relatively poor properties believed to be due to insufficient or inadequate curing or crosslinking because of a lack of preheating and postheating in the flame spray application method.

It would therefore be desirable to have available an epoxy based powder coating formulation which provides desirable coating properties when applied by the flame spray method.

SUMMARY OF THE INVENTION

One aspect of the present invention pertains to an epoxy resin based powder coating composition comprising (A) a melt blended, pre-reacted component comprising
  (1) from about 75 to about 98 percent by weight of at least one solid epoxy resin having a degree of polymerization of from about zero to about 7; and
  (2) from about 2 to about 25 percent by weight of at least one olefinic polymer containing from about 0.1 to about 55 percent by weight of at least one group reactive with vicinal epoxy groups;

(B) a melt blended, pre-reacted component comprising
  (3) from about 10 to about 60 percent by weight of at least one solid epoxy resin having a degree of polymerization of from about 1 to about 6; and
  (4) from about 40 to about 90 percent by weight of at least one olefinic polymer containing from about 0.1 to about 55 percent by weight of at least one group reactive with vicinal epoxy groups; and (C) a melt blended, non-reacted composition comprising
  (5) from about 40 to about 90 percent by weight of at least one solid epoxy resin having a degree of polymerization of from about 1 to about 10;
  (6) from about 10 to about 50 percent by weight of at least one inorganic filler; and wherein (a) component (A) is present in an amount of from about 20 to about 45 percent by weight based upon the combined weight of components (A), (B) and (C);
(b) component (B) is present in an amount of from about 12 to about 36 percent by weight based upon the combined weight of components (A), (B) and (C);
(c) component (C) is present in an amount of from about 19 to about 68 percent by weight based upon the combined weight of components (A), (B) and (C);
(d) components (A), (B) and (C) are separately size reduced and classified into a fine powder by any suitable means; and
(e) the resultant powder composition of (A), (B) and (C) is dry blended by any suitable means.

The term "degree of polymerization" means the number of times a group or moiety within a polymer chain is repeated.

Another aspect of the present invention pertains to articles flame spray coated with the above coating composition.

DETAILED DESCRIPTION OF THE INVENTION

The present invention provides a composition which results in a powder coating which can be applied by the flame spray technique resulting in a coating with good properties such as impact strength, appearance, adhesion, scratch resistance, flow out, pigmentability, low temperature/ambient fusion and the like. However, unlike conventional epoxy resin based powder coating compositions, the compositions of the present invention "fuses" to provide a continuous, non-porous coating, much like other thermoplastic coatings and does not "cure" or "crosslink" per se to any appreciable extent.

This thermoplastic characteristic permits the coating composition of the present invention to be easily repaired in the event of objectionable damage. Suitable repair can often be accomplished by simply reheating the coating at the damaged point to allow existing coating material onto the damaged area to fuse together and/or by flame spraying additional material onto the damage area; unlike conventional epoxy coatings compositions which are recognized as being very difficult to repair after being cured.

High performance coating systems are typically applied in multiple coats. The required "curing" of conventional epoxy resin based powder coatings invariably dictates long time intervals between coating applications, whereas the compositions of the present invention has no such limitation.

Any method which accomplishes the reaction between the epoxy groups of the epoxy resin and the groups reactive with an epoxy group of the olefinic polymer containing such groups is suitable for the purposes of the present invention for the preparation of components (A) and (B).

In a particularly preferred method, the solid epoxy resin and the olefinic polymer containing groups reactive with epoxy groups are conveniently reacted together by melt blending in an extruder or other convenient means at an elevated temperature of from about 60° C. to about 150° C., preferably from about 80° C. to about 110° C., more preferably from about 90° C. to about 100° C. for a time sufficient to complete the reaction and provide adequate mixing of the two components.

Component (A) of the present invention contains from about 75 to about 98, preferably from about 79 to about 95, more preferably from about 84 to about 90 percent by weight of at least one solid epoxy resin having a degree of polymerization of from about 0 to about 7, preferably from about 1 to about 5; and from about 2 to about 25, preferably from about 5 to about 20, more preferably from about 10 to about 16 percent by weight of at least one olefinic polymer containing a group reactive with vicinal epoxy groups;

SOLID EPOXY RESIN

The solid epoxy resins which can be employed in the present invention include any of those represented by the following general formula I

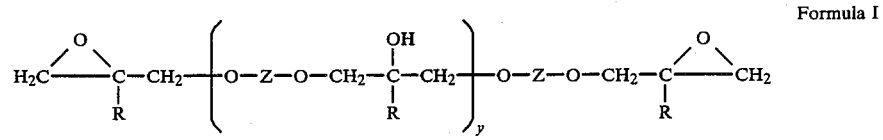

Formula I

Component (B) of the present invention contains from about 10 to about 60, preferably from about 20 to about 50, more preferably from about 30 to about 40 percent by weight of at least one solid epoxy resin having a degree of polymerization of from about 1 to about 6 preferably from about 2 to about 5 and from about 40 to about 90, preferably from about 50 to about 80, more preferably from about 60 to about 70 percent by weight of at least one olefinic polymer containing at least one group reactive with vicinal epoxy groups.

Component (C) of the present invention contains from about 40 to about 90, preferably from about 50 to about 80, more preferably from about 60 to about 70 percent by weight of at least one solid epoxy resin having a degree of polymerization of from about 1 to about 10, preferably from about 2 to about 5; and from about 10 to about 50, preferably from about 20 to about 40, more preferably from about 25 to about 35, percent by weight of at least one inorganic filler.

Component (A) is usually employed in amounts of from about 20 to about 45, preferably from about 25 to about 40, more preferably from about 27 to about 38, percent by weight based upon the combined weight of components (A), (B) and (C).

Component (B) is usually employed in amounts of from about 12 to about 36, preferably from about 15 to about 33, more preferably from about 18 to about 28, percent by weight based upon the combined weight of components (A), (B) and (C).

Component (C) is usually employed in amounts of from about 19 to about 68, preferably from about 27 to about 60, more preferably from about 32 to about 55, percent by weight based upon the combined weight of components (A), (B) and (C).

wherein each R is independently hydrogen or an alkyl group having from 1 to about 3 carbon atoms; each Z is independently a divalent moiety containing at least one aromatic ring constituent: and y has a value suitably from about 0 to about 10, more suitably from about 1 to about 7, most suitably from about 1 to about 5.

In the above formulation, the value of y is the degree of polymerization for the epoxy resins encompassed by the above formula I.

Particularly suitable moieties which are represented by Z in the above formula include, for example: phenyl or hydrocarbyl or hydrocarbyloxy or halogen substituted phenyl moieties; hydrocarbyl or hydrocarbyloxy or halogen substituted phenyl moieties; biphenyl moieties: hydrocarbyl or hydrocarbyloxy or halogen substituted biphenyl moieties; hydrocarbyl or hydrocarbyloxy or halogen substituted biphenyl moieties wherein the phenyl groups are separated or bridged by a divalent alkyl having suitably from 1 to about 12, more suitably from 1 to about 6, more suitably from 1 to about 4 carbon atoms, —S—, —S—S—, —SO—, —SO$_2$—, —O—, or —CO— group: moieties having more than two aromatic rings or hydrocarbyl or hydrocarbyloxy or halogen substituted aromatic rings wherein the rings are separated or bridged by a divalent alkyl, —S—, —S—S—, —SO—, —SO$_2$—, —O—, or —CO— group; and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the object to which it is attached.

More particularly suitable such divalent moieties include, for example, those represented by the following general formulas II–VI

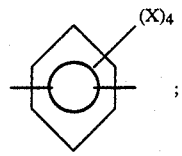

Formula II

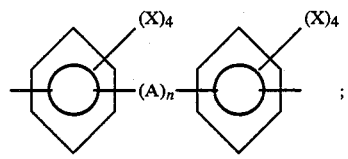

Formula III

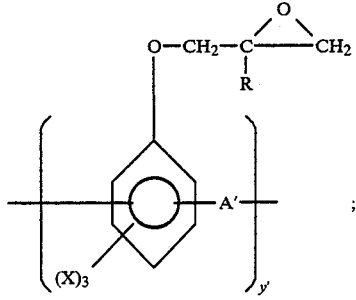

Formula IV

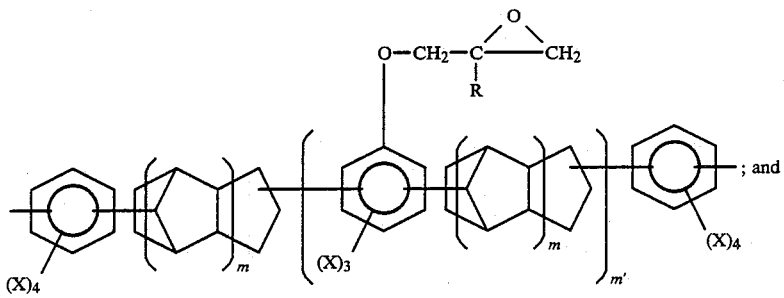

Formula V

; and

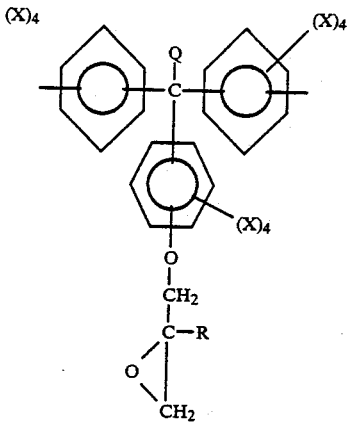

Formula VI wherein each A is independently a divalent hydrocarbyl group having suitably from 1 to about 12, more suitably from 1 to about 6, most suitably from 1 to about 4, carbon atoms, —S—, —S—S—, —O—, —SO—, —SO$_2$—, or —CO—; each A' is independently a divalent hydrocarbyl group having from 1 to about 10, more suitably from 1 to about 4, most suitably from 1 to about 2, carbon atoms; each Q is independently hydrogen or an alkyl group having from 1 to about 4 carbon atoms; each R is independently hydrogen or an alkyl group having from 1 to about 3 carbon atoms; each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine; each m suitably has a value from zero to about 10, more suitably from about 1 to about 7, most suitably from about 1 to about 5: and each m' suitably has an average value from zero to about 8, more suitably from about 1 to about 6, most suitably from about 1 to about 4; n has a value of zero or 1: and y' has an average value suitably from about 0.01 to about 8, more suitably from about 1 to about 6, most suitably from about 2 to about 4.

Most particularly suitable such divalent moieties include, for example, those represented by Formulas III, IV or V wherein each R is hydrogen; each A is a methylene, isopropylidene or carbonyl group; each A' is a methylene group; each m has an average value of from about 2 to about 5, m' has an average value from about 2 to about 4, and y' has an average value of from 1 to about 4.

The solid epoxy resins employed herein usually have a Kinematic melt viscosity of from about 325 to about 150,000 centistokes (0.000325 to 0.15 m$^2$/s) at 150° C., and a Mettler softening point of from about 60° C. to about 175° C. When the epoxy resins are bisphenol A based, they conveniently have epoxide equivalent weights (EEW) of from about 475 to about 3200.

These solid epoxy resins can be conveniently prepared by reacting a diglycidyl ether of the appropriate phenolic hydroxyl containing compound with the appropriate phenolic hydroxyl containing compound in the presence of a suitable catalyst such as a phosphonium compound. This and other methods for preparing solid epoxy resins can be found in *Handbook of Epoxy Resins* by Lee and Neville, McGraw-Hill (1967) which is incorporated herein by reference in its entirety.

OLEFINIC POLYMERS CONTAINING GROUPS REACTIVE WITH EPOXY GROUPS

The olefinic polymers containing groups reactive with epoxy groups are prepared by any suitable means which incorporates by either interpolymerization, chemical or extrusion grafting onto the polymer a chemical group which is reactive with an epoxide group. Suitable such groups which are reactive with epoxide groups include, for example, carboxylic acid groups, anhydride groups, hydroxyl groups and the like.

The polymers can be prepared by polymerizing one or more α-olefins with one or more ethylenically unsaturated monomers which contains a group reactive with an epoxide group. Particularly suitable α-olefins include, for example, ethylene, propylene, butene-1, pentene-1, hexene-1, heptene-1, octene-1, nonene-1, decane-1, undecene-1, dodecene-1, and any combination thereof and the like. Particularly suitable ethylenically unsaturated monomers which contain a group reactive with an epoxide group which can be employed herein include, for example, acrylic acid, methacrylic acid, maleic anhydride, allyl alcohol, hydroxyethyl acrylate, hydroxyethyl methacrylate, hydroxypropyl acrylate, hydroxypropyl methacrylate, combinations thereof and the like. If desired, the polymer can also employ at least one other monomer in their preparation such as, for example, alkyl and aryl esters of ethylenically unsaturated carboxylic acids, such as, for example, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, 2-ethylhexyl acrylate, 2-ethylhexyl methacrylate, vinyl acetate, vinyl toluene, styrene, vinyl acetate, combinations thereof and the like. Also suitable are those polymers wherein the carboxylic acid groups have been ionomerized by reaction with an alkali or alkaline earth metal salts such as, for example, zinc oxide, zinc hydroxide, calcium chloride, calcium hydroxide, magnesium oxide, cesium oxide, zinc chloride, or any combination thereof. Also suitable are those polymers wherein the ester groups have been saponified with an alkali or alkaline earth metal hydroxide such as, for example, sodium hydroxide, potassium hydroxide, lithium hydroxide, barium hydroxide, calcium hydroxide, magnesium hydroxide, any combination thereof and the like. The only criteria of the polymer is that it contain from about 0.1 to about 55, preferably from about 2 to about 45, more preferably from about 5 to about 35 percent by weight of groups reactive with an epoxide group.

The interpolymers or copolymers can be prepared by polymerizing the desired monomers in the presence of one or more well known free radical generating catalysts such as, for example, peroxides, azo compounds, Ziegler-Natta catalysts and the like. Particularly suitable such catalysts include, for example, t-butyl peroctoate, ditert-butyl peroxide, triethylaluminum-titanium-trichloride, 2,2'-azobis(2-methyl butyronitrile), combinations thereof and the like.

The melt blended, reacted blends can be particulated by any suitable means such as, for example, cryogenic grinding at temperatures below zero degrees centigrade, in an impact, hammer, rotor, roll, ball or attrition type or air classifying type mill, or the like.

After particulating the melt blended components, they can be sized by passing them through various screens of the appropriate size.

The blends preferably have an average particle size of less than 225 microns, preferably from about 50 to about 175, most preferably from about 75 to about 150 microns.

INORGANIC FILLERS

Particularly suitable inorganic fillers which can be employed herein include, for example, titanium dioxide, zinc oxide, calcium carbonate, silicon dioxide, microtalc, alumina, flint powder, mica, glass, Bentonite clay, calcium silicate, molybdenum disulfide, any combination thereof and the like.

MISCELLANEOUS ASPECTS OF THE INVENTION

The powder coating compositions of the present invention can contain, if desired, flow control or modifier agents, leveling agents, hardeners or curing agents or catalysts, pigments or colorants, and the like.

The flame sprayable, powder coating compositions of the present invention can contain from about 0.1 to about 5, preferably from about 0.5 to about 4, more preferably from about 0.75 to about 2.5, percent by weight of a flow control or modifier agent. Particularly suitable flow control or modifier agents include, for example, amidified silica flow aid, polymeric acrylate flow modifiers and the like.

The flame sprayable, powder coating compositions of the present invention can contain from about 0.05 to about 4, preferably from about 0.1 to about 3, more preferably from about 0.5 to about 2.5, percent by weight of a non-accelerated amide, amine or phenolic hardener or curing agent or catalyst. Particularly suitable such non-accelerated amide, amine, anhydride or phenolic hardeners or curing agents or catalysts which can be employed herein include, for example, diethylenetriamine, triethylenetetramine, aminoethyl piperazine, phthalic anhydride, Nadic Methyl Anhydride TM (methylbicyclo(2.2.1)heptene-2,3- dicarboxylic anhydride isomers), metaphenylene diamine, dicyandiamide, phenol-formaldehyde novolac resins, any combination thereof and the like.

The flame sprayable powder coatings of the present invention are suitable for coating any type of substrate such as plastic, metal, wood, concrete and the like; particularly, the interior and exterior of pipe, storage vessels and tanks, and other transportation, industrial and marine substrates.

The following examples are illustrative of the invention, but are not to be construed as to limiting the scope thereof in any manner.

EXAMPLE 1

Preparation of Component A

A pre-reacted blend comprising (a) 40.0% by weight of a Bisphenol A based solid epoxy resin having an epoxide equivalent weight (EEW) of about 900 and a Mettler softening point of about 101° C., (b) 40.0% by weight of a low molecular weight phenol-formaldehyde novolac-modified Bisphenol A based solid epoxy resin having about a 525 EEW and a Mettler softening point of about 94° C., and (c) 6.0% by weight of a Bisphenol A based solid epoxy resin having an EEW of about 525 and a Mettler softening point of about 80° C.; and (c)

12% by weight of an ethylene-acrylic acid copolymer containing about 20% by weight acrylic acid and having a melt flow rate of about 65 g/10 min. at 125° C. by ASTM D-1238, condition D (1985) is prepared in 1-quart Banbury mixer at a plastic temperature of about 104° C. The resultant blend is cooled, cryogenically ground at −55° C. on a Mikro-Pul hammer mill and classified through a U.S. Standard 80 Mesh Sieve (175 microns) on a Roto-Tap lab unit.

Preparation of Component B

A pre-reacted blend component comprising (a) 35% by weight of a Bisphenol A based solid epoxy resin having an epoxide equivalent weight (EEW) of about 900 and a Mettler softening point of about 101° C.; and (b) 65% by weight of an ethylene-acrylic acid copolymer containing 20% by weight acrylic acid and having a melt flow rate of about 65 g/10 min. at 125° C. by ASTM D-1238, condition D (1985) is prepared in a 1-quart Banbury mixer at a plastic temperature of about 89° C. The resultant blend is also cooled, cryogenically ground at −128° C. and classified through an U.S. Standard 80 Mesh sieve (175 microns) on a Roto-Tap lab unit.

Preparation of Component C

A melt mixed blend comprising (a) 65% by weight of a Bisphenol A based solid epoxy resin having a 525 EEW and a Mettler softening point of about 80° C., (b) 30% by weight of titanium dioxide filler, 2.0% by weight of solid non-accelerated dicyandiamide catalyst, (c) 0.8% by weight of a polymeric acrylate flow aid (ACRYLON ™ MFP - supplied by Syntron) and (d) 0.8% by weight benzoin as a leavening aid, is prepared in a Banbury mixer at a plastic temperature of about 96° C. The resultant product is cooled, cryogenically ground at −37° C. and classified through an U.S. Standard 80 Mesh sieve (175 microns) on a Roto-Tap lab unit.

The final composition is prepared by dry-blending 31.6% by weight of component (A), 22.5% by weight of component (B) and 38.6% by weight of component (C) with 2.0% by weight of an amidified silica flow aid (Sylobloc 150 - supplied by W. R. Grace), 0.22% by weight non-accelerated dicyandiamide catalyst, 0.8% by weight of a polymeric acrylate flow aid and 0.8% by weight benzoin as a leavening agent. The dry mixture is additionally classified through a U.S. Standard 80 Mesh sieve (175 microns) on a Roto-Tap lab unit to insure complete fineness.

This finely powdered thermoplastic epoxy composition is flame-sprayed onto a 2'×2'×⅛" (50.8 mm×50.8 mm×3.175 mm) prepared cold-rolled steel plate using an Uni-Spray Jet plastic flame-spray gun (supplied by UTP Welding Materials) set to 5 psi acetylene, 30 psi oxygen and 75 psi air. The resulting coating is allowed to cool free-standing to ambient temperature which requires less than 15 minutes and the final fused coating measures 3.5 mils and has a smooth, attractive appearance. The application rate of the fine powder is about 5.25 sq. ft/min., the coating shows no adhesion loss in cross-hatched testing and in conical-mandrel bending up to 1 inch. Pencil hardness measured 2H, forward impact strength measured 100 in.-lbs. and reverse impact strength measured 50 in.-lbs. without metal exposure. Also, excessive impacts could be quickly repaired by flame-polishing without additional powder deposition.

COMPARATIVE EXPERIMENT A

For comparative purposes, Component (C) is flame-sprayed through the Uni-Spray Jet equipment at the same settings. The resultant coating is very smooth but very brittle with no measurable impact strength and adhesion. Attempts to repair cracks in the coating by flame-polishing and/or by additional powder depositions, are unsuccessful.

What is claimed is:

1. An epoxy resin based powder coating composition comprising
    (A) a melt blended, pre-reacted component comprising
        (1) from about 75 to about 98 percent by weight of at least one solid epoxy resin having a degree of polymerization of from about 0 to about 7; and
        (2) from about 2 to about 25 percent by weight of at least one olefinic polymer containing from about 0.1 to about 55 percent by weight of at least one group reactive with vicinal epoxy groups:
    (B) a melt blended, pre-reacted component comprising
        (3) from about 10 to about 60 percent by weight of at least one solid epoxy resin having a degree of polymerization of from about 1 to about 6; and
        (4) from about 40 to about 90 percent by weight of at least one olefinic polymer containing from about 0.1 to about 55 percent by weight of at least one group reactive with vicinal epoxy groups; and
    (C) a melt blended, non-reacted composition comprising
        (5) from about 40 to about 90 percent by weight of at least one solid epoxy resin having a degree of polymerization of from about 1 to about 10;
        (6) from about 10 to about 60 percent by weight of at least one inorganic filler; and
    wherein
    (a) component (A) is present in an amount of from about 20 to about 45 percent by weight based upon the combined weight of components (A), (B) and (C);
    (b) component (B) is present in an amount of from about 12 to about 36 percent by weight based upon the combined weight of components (A), (B) and (C); and
    (c) component (C) is present in an amount of from about 19 to about 68 percent by weight based upon the combined weight of components (A), (B) and (C).

2. A flame sprayable composition of claim 1 wherein
    (a) component (A-1) is present in an amount of from about 79 to about 95 percent by weight;
    (b) component (A-2) is present in an amount of from about 5 to about 20 percent by weight;
    (c) component (B-3) is present in an amount of from about 20 to about 50 percent by weight;
    (d) component (B-4) is present in an amount of from about 50 to about 50 percent by weight;
    (e) component (C-5) is present in an amount of from about 50 to about 80 percent by weight;
    (f) component (C-6) is present in an amount of from about 20 to about 50 percent by weight;
    (g) component (A) is present in an amount of from about 25 to about 40 percent by weight based upon the combined weight of components (A), (B) and (C);
(h) component (B) is present in an amount of from about 15 to about 33 percent by weight based upon the combined weight of components (A), (B) and (C); and
(i) component (C) is present in an amount of from about 27 to about 60 percent by weight based upon the combined weight of components (A), (B) and (C).

3. A flame sprayable composition of claim 1 wherein (a) component (A-1) is present in an amount of from about 84 to about 90 percent by weight;
(b) component (A-2) is present in an amount of from about 10 to about 16 percent by weight;
(c) component (B-3) is present in an amount of from about 30 to about 40 percent by weight;
(d) component (B-4) is present in an amount of from about 60 to about 70 percent by weight;
(e) component (C-5) is present in an amount of from about 60 to about 70 percent by weight;
(f) component (C-6) is present in an amount of from about 25 to about 35 percent by weight;
(g) component (A) is present in an amount of from about 27 to about 38 percent by weight based upon the combined weight of components (A), (B) and (C);
(h) component (B) is present in an amount of from about 18 to about 28 percent by weight based upon the combined weight of components (A), (B) and (C); and
(i) component (C) is present in an amount of from about 32 to about 55 percent by weight based upon the combined weight of components (A), (B) and (C).

4. A flame sprayable composition of claim 1, 2 or 3 wherein
(a) components (A-1), (B-3) and (C-5) are independently selected from those solid epoxy resins represented by the following general formula I

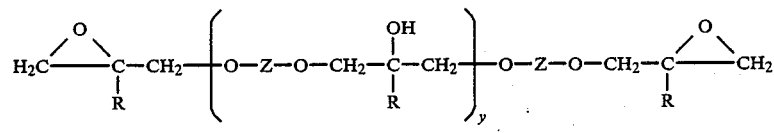

Formula I wherein each R is independently hydrogen or an alkyl group having from 1 to about 3 carbon atoms; each Z is independently a divalent moiety containing at least one aromatic ring constituent; and y has a value from about 0 to about 10; and
(b) components (A-2) and (B-4) are independently selected from those olefinic polymers prepared by interpolymerizing one or more α-olefins and one or more ethylenically unsaturated carboxylic acids, which polymer contains from about 0.1 to about 55 percent carboxyl groups by weight.

5. A flame sprayable composition of claim 4 wherein
(a) components (A-1), (B-3) and (C-5) are independently selected from those solid epoxy resins represented by formula I wherein each R is hydrogen: y has a value from about 1 to about 7; and each Z is independently selected from the moieties represented by the following formulas II-VI

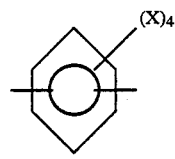

Formula II

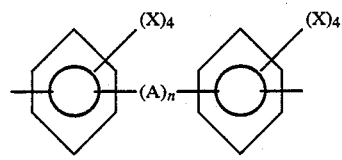

Formula III

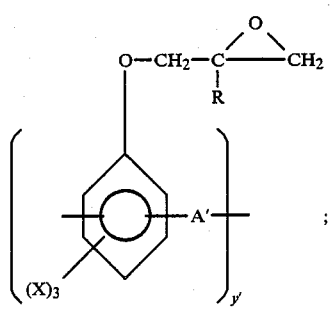

Formula IV

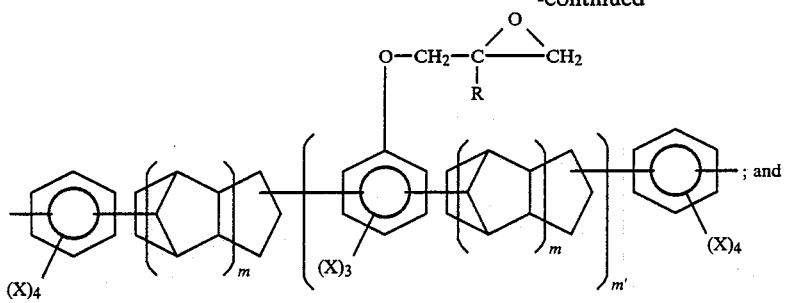

Formula V wherein each A is independently a divalent hydrocarbyl group suitably having from 1 to about 12 carbon atoms, —S—, —S—S—, —O—, —SO—, —SO$_2$—, or —CO—, each A' is independently a divalent hydrocarbyl group having from 1 to about 10 carbon atoms; each Q is independently hydrogen or an alkyl

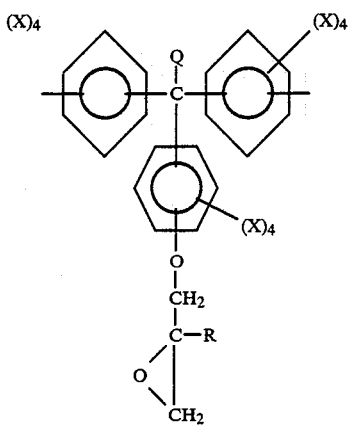

Formula VI group having from 1 to about 4 carbon atoms; each R is independently hydrogen or an alkyl group having from 1 to about 3 carbon atoms; each X is independently hydrogen, a hydrocarbyl or hydrocarbyloxy group having from 1 to about 12 carbon atoms or a halogen atom: each m has a value from zero to about 10: and each m' has an average value from zero to about 8: n has a value of zero or 1; and y' has an average value from about 1 to about 6; and (b) components (A-2) and (B-4) are independently selected from those olefinic polymers prepared by interpolymerizing one or more α-olefins having up to about 10 carbon atoms and one or more ethylenically unsaturated carboxylic acids, which polymer contains from about 2 to about 45 percent carboxyl groups by weight.

6. A flame sprayable composition of claim 5 wherein
(a) components (A-1), (B-3) and (C-5) are independently selected from those solid epoxy resins represented by formula I wherein each R is hydrogen: y has a value from about 1 to about 5: and each Z is independently selected from the moieties represented by formulas III–V wherein each A is independently a divalent hydrocarbyl group having suitably from 1 to about 6 carbon atoms: each A' is independently a divalent hydrocarbyl group having from 1 to about 4 carbon atoms: each X is independently hydrogen, a hydrocarbyl or hydrocarbyloxy group having from 1 to about 6 carbon atoms or chlorine or bromine: each m has a value from about 0 to about 10; and each m' has an average value from about 1 to about 6; n has a value of 1; and y' has an average value from about 1 to about 6; and (b) components (A-2), (B-4) are independently selected from those olefinic polymers prepared by interpolymerizing one or more α-olefins having up to about 6 carbon atoms and one or more ethylenically unsaturated carboxylic acids, which polymer contains from about 2 to about 45 carboxyl groups by weight.

7. A flame sprayable composition of claim 6 wherein
(a) components (A-1), (B-3) and (C-5) are independently selected from those solid epoxy resins represented by formula I wherein each R is hydrogen; y has a value from about 1 to about 5: and each Z is independently selected from the moieties represented by formulas III–IV wherein each A is independently a divalent hydrocarbyl group having from 1 to about 4 carbon atoms; each A' is independently a divalent hydrocarbyl group having from 1 to about 2 carbon atoms; each X is independently hydrogen, a hydrocarbyl or hydrocarbyloxy group having from 1 to about 4 carbon atoms or chlorine or bromine: each m has a value from about 1 to about 7; and each m' has an average value from about 1 to about 4; n has a value of 1; and y' has an average value from about 2 to about 4; and (b) components (A-2), (B-4) are independently selected from those olefinic polymers prepared by interpolymerizing one or more α-olefins having up to about 6 carbon atoms and one or more ethylenically unsaturated carboxylic acids, which polymer contains from about 2 to about 45 percent carboxyl groups by weight.

8. A flame sprayable composition of claim 6 wherein
(a) components (A-1), (B-3) and (C-5) are independently selected from those solid epoxy resins represented by formula I wherein each R is hydrogen; y has a value from about 1 to about 5; and each Z is independently selected from the moieties represented by formulas III–IV wherein each A is independently a divalent hydrocarbyl group having from 1 to about 4 carbon atoms: each A' is a methylene group: each X is independently hydrogen, a methyl group or a bromine atom; each m has a value from about 1 to about 5; and each m' has an average value from about 1 to about 4; n has a value of 1; and y' has an average value from about 2 to about 4; and (b) components (A-2), (B-4) are independently selected from those olefinic polymers prepared by interpolymerizing ethylene and one or more α-olefins having up to about 6 carbon atoms and acrylic acid or methacrylic acid or a combination of acrylic and methacrylic acids, which polymer contains from about 5 to about 35 percent carboxyl groups by weight.

9. A flame sprayable composition of claim 8 wherein
   (a) components (A-1), (B-3) and (C-5) are selected from (i) bisphenol-A based solid epoxy resins, (ii) phenol-formaldehyde modified bisphenol A based solid epoxy resins or (iii) a combination of (i) and (ii);
   (b) components (A-2) and (B-4) are copolymers of ethylene and acrylic acid; and
   (c) component (C-6) is titanium dioxide.

10. A flame sprayable composition of claim 1, 2 or 3 wherein
    (a) components (A), (B) and (C) are separately size reduced and classified into a fine powder by any suitable means; and
    (b) the resultant powder composition of (A), (B) and (C) is dry blended by any suitable means.

11. A flame sprayable composition of claim 4 wherein
    (a) components (A), (B) and (C) are separately size reduced and classified into a fine powder by any suitable means; and
    (b) the resultant powder composition of (A), (B) and (C) is dry blended by any suitable means.

12. A flame sprayable composition of claim 5 wherein
    (a) components (A), (B) and (C) are separately size reduced and classified into a fine powder by any suitable means; and
    (b) the resultant powder composition of (A), (B) and (C) is dry blended by any suitable means.

13. A flame sprayable composition of claim 6 wherein
    (a) components (A), (B) and (C) are separately size reduced and classified into a fine powder by any suitable means; and
    (b) the resultant powder composition of (A), (B) and (C) is dry blended by any suitable means.

14. A flame sprayable composition of claim 7 wherein
    (a) components (A), (B) and (C) are separately size reduced and classified into a fine powder by any suitable means; and
    (b) the resultant powder composition of (A), (B) and (C) is dry blended by any suitable means.

15. A flame sprayable composition of claim 8 wherein
    (a) components (A), (B) and (C) are separately size reduced and classified into a fine powder by any suitable means; and
    (b) the resultant powder composition of (A), (B) and (C) is dry blended by any suitable means.

16. A flame sprayable composition of claim 9 wherein
    (a) components (A), (B) and (C) are separately size reduced and classified into a fine powder by any suitable means; and
    (b) the resultant powder composition of (A), (B) and (C) is dry blended by any suitable means.

17. An article coated with a flame sprayable composition of claim 1, 2 or 3.

18. An article coated with a flame sprayable composition of claim 4.

19. An article coated with a flame sprayable composition of claim 5.

20. An article coated with a flame sprayable composition of claim 6.

21. An article coated with a flame sprayable composition of claim 7.

22. An article coated with a flame sprayable composition of claim 8.

23. An article coated with a flame sprayable composition of claim 9.

24. An article coated with a flame sprayable composition of claim 10.

25. An article coated with a flame sprayable composition of claim 11.

26. An article coated with a flame sprayable composition of claim 12.

27. An article coated with a flame sprayable composition of claim 13.

28. An article coated with a flame sprayable composition of claim 14.

29. An article coated with a flame sprayable composition of claim 15.

30. An article coated with a flame sprayable composition of claim 16.

* * * * *